(12) United States Patent
Havens et al.

(10) Patent No.: US 7,717,343 B2
(45) Date of Patent: May 18, 2010

(54) HIGH-EFFICIENCY ILLUMINATION IN DATA COLLECTION DEVICES

(75) Inventors: William H. Havens, Syracuse, NY (US); James A. Cairns, Victor, NY (US)

(73) Assignee: Hand Held Products, Inc., Skaneateles Falls, NY (US)

(*) Notice: Subject to any disclaimer, the term of this patent is extended or adjusted under 35 U.S.C. 154(b) by 130 days.

(21) Appl. No.: 11/652,969

(22) Filed: Jan. 12, 2007

(65) Prior Publication Data

US 2007/0158428 A1 Jul. 12, 2007

(51) Int. Cl.
G06K 7/10 (2006.01)
G06K 9/22 (2006.01)
G06K 9/36 (2006.01)
G06K 9/80 (2006.01)

(52) U.S. Cl. ............. 235/472.01; 235/454; 235/462.01; 235/462.42; 235/462.43; 235/462.45; 235/472.02; 235/472.03; 257/98; 257/99; 257/100; 362/85; 362/247; 362/331; 362/373

(58) Field of Classification Search ................. 235/454, 235/462.01–462.45, 472.01, 472.02; 257/98–100, 257/80–85; 362/85, 247, 331, 373; 250/214.1, 250/239
See application file for complete search history.

(56) References Cited

U.S. PATENT DOCUMENTS

| | | | | |
|---|---|---|---|---|
| 5,736,726 A * | 4/1998 | VanHorn et al. | ....... | 235/472.02 |
| 6,042,012 A * | 3/2000 | Olmstead et al. | ....... | 235/462.41 |
| 6,073,851 A * | 6/2000 | Olmstead et al. | ....... | 235/462.45 |
| 6,498,358 B1 | 12/2002 | Lach et al. | | |
| 6,734,465 B1 * | 5/2004 | Taskar et al. | ................. | 257/80 |
| 6,831,302 B2 | 12/2004 | Erchak et al. | | |
| 6,878,871 B2 | 4/2005 | Scher et al. | | |
| 6,918,946 B2 | 7/2005 | Korgel et al. | | |
| 6,987,288 B2 | 1/2006 | Rattier et al. | | |
| 7,012,279 B2 | 3/2006 | Wierer, Jr. et al. | | |
| 7,087,833 B2 | 8/2006 | Scher et al. | | |
| 7,132,787 B2 | 11/2006 | Ozkan et al. | | |
| 2001/0001207 A1 * | 5/2001 | Shimizu et al. | ............... | 257/98 |
| 2002/0030194 A1 * | 3/2002 | Camras et al. | ................. | 257/98 |
| 2002/0097962 A1 * | 7/2002 | Yoshimura et al. | ............ | 385/50 |

(Continued)

OTHER PUBLICATIONS

Sui Wenhui, Zhang Bei, Wang Dajun, Luan Feng, Xu Wanjin, Ma Xiaoyu; "The Improvement of Extractive Emission in InGaAlP Quantum Wells Light Emitting Diodes by Microstructures" ;Acta Scientiarum Naturalium Universitatis Pekinensis; Published Date: May 20, 2003 vol. 39 No. 3 pp. 331-335, including English translation thereof. (12 pages).

(Continued)

*Primary Examiner*—Thien M. Le
*Assistant Examiner*—Tuyen K Vo
(74) *Attorney, Agent, or Firm*—Marjama Muldoon Blasiak & Sullivan LLP

(57) ABSTRACT

A hand held data collection device, such as a bar code scanner, portable data terminal, transaction terminal, or bar code verifier, containing at least one light-emitting diode (LED) that has been modified to improve the efficiency of light energy transmission. The modification involves transition features at the interface between the LED die surface and the ambient environment. Devices using such modified LEDs may offer a number of advantages such as extended read range, decreased read time, and improved battery life.

20 Claims, 11 Drawing Sheets

U.S. PATENT DOCUMENTS

| | | | |
|---|---|---|---|
| 2004/0150991 A1* | 8/2004 | Ouderkirk et al. | 362/231 |
| 2006/0071225 A1* | 4/2006 | Beeson et al. | 257/98 |
| 2006/0092532 A1* | 5/2006 | Ouderkirk et al. | 359/819 |
| 2007/0115555 A1* | 5/2007 | Nellissen | 359/619 |
| 2008/0137920 A1* | 6/2008 | Miura et al. | 382/124 |

OTHER PUBLICATIONS

R. C. Johnson; "Metamaterials yield left-handed complement for optics"; Electronic Engineering Times, May 23, 2005.

S. Enoch, E. Popov, N. Michel, R. Reinisch; "Subwavelength hole array enhanced light transmission"; Proceedings of SPIE, vol. 4438 (2001). 8 pages.

Jaehee Cho, Hyunsoo Kim, Hyungkun Kim, Jeong Wook Lee, Sukho Yoon, Cheolsoo Sone, Yongjo Park, Euijoon Yoon Ti: "Simulation and fabrication of highly efficient InGaN-based LEDs with corrugated interface substrate", SO: physica status solidi (c),VL: 2 No. 7 p. 2874-2877 YR: 2005, [CP: Copyright © 2005 WILEY-VCH Verlag GmbH & Co. KGaA, Weinheim ON: 1610-1642, PN: 1610-1634, AD: Photonics Lab., Samsung Advanced Institute of Technology, P.O. Box 111, Suwon 440-600, Korea; 2 School of Material Science and Engineering, and Inter-university Semiconductor Research Center, Seoul National University, Seoul 151-742, Korea, DOI: 10.1002/pssc.200461337. 4 pages.

C.C. Sun, C.Y. Lin T.X. Lee T.H. Yang; "Enhancement of light extraction of GaN-Based LED with introducing micro-structure array"; Opt. Eng. 43, 1700-1701 (2004). 2 pages.

T.X. Lee, C.Y. Lin, S.H. Ma, C.C. Sun; "Analysis of position-dependent light extraction GaN-based LEDs"; May 30, 2005/vol. 13, No. 11 /Optics Express 4175. 5 pages.

Hyun Kyong Cho, Junho Jang, Jeong-Hyeon Choi, Jaewan Choi, Jongwook Kim, Joeng Soo Lee, Beomseok Lee, Young Ho Choe, Ki-Dong Lee, Sang Hoon Kim, Kwyro Lee; "Light extraction enhancement from nanoimprinted photonic crystal GaN-based blue light emitting diodes"; Sep. 18, 2006 / vol. 14, No. 19 / Optics Express 8654. 7 pages.

D. H. Kim, C. O. Cho, Y. G. Roh, H. Jeon, Y. S. Park, J. Cho, J. S. Im, C. Sone, Y. Park, W. J. Choi, and Q-Han Park; "Enhanced light extraction from GaN-based light-emitting diodes with holographically generated two-dimensional photonic crystal patterns,"; Appl. Phys. Lett. 87, 203508 (2005) . 3 pages.

K Hadobás, S Kirsch, A Carl, M Acet and E F Wassermann; "Reflection properties of nanostructure-arrayed silicon surfaces"; 2000 Nanotechnology 11 161-164 doi: 10.1088/0957-4484/11/3/304. 4 pages.

* cited by examiner

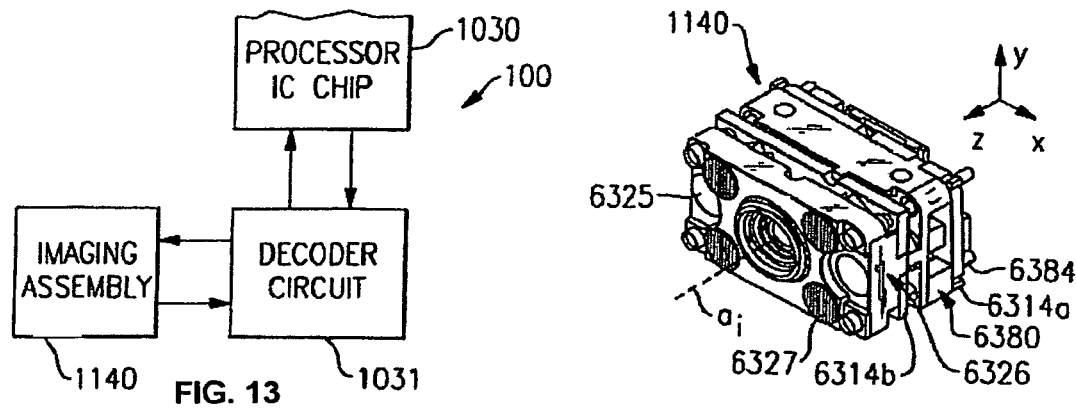
FIG. 13
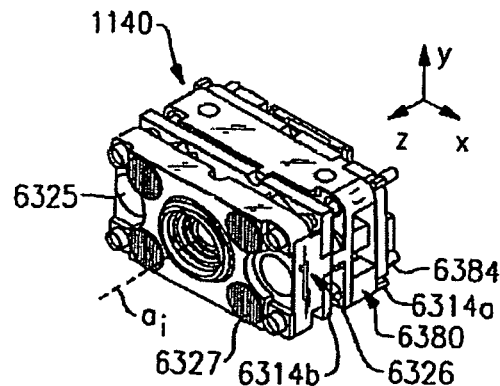
FIG. 14
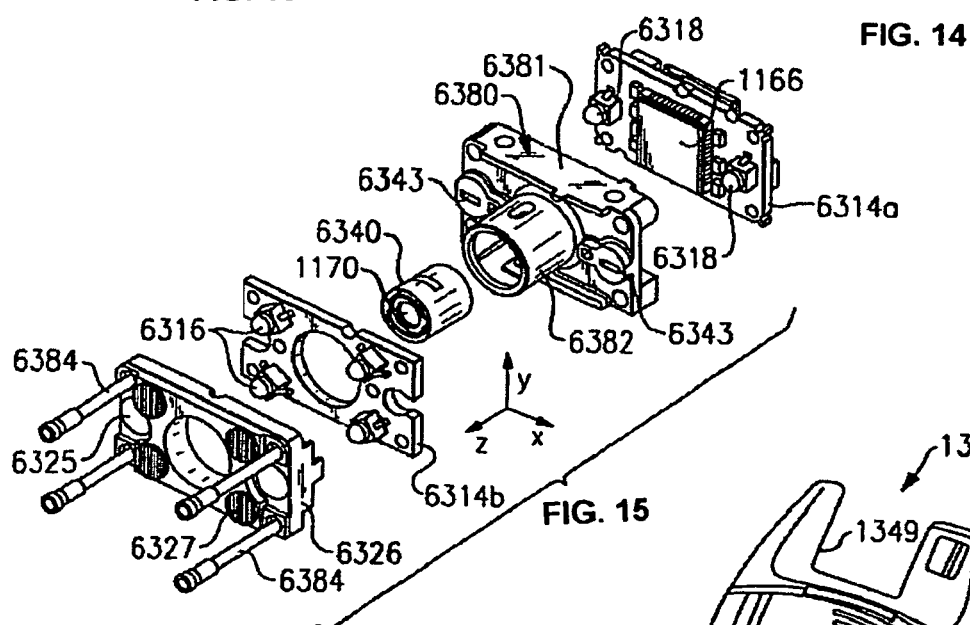
FIG. 15
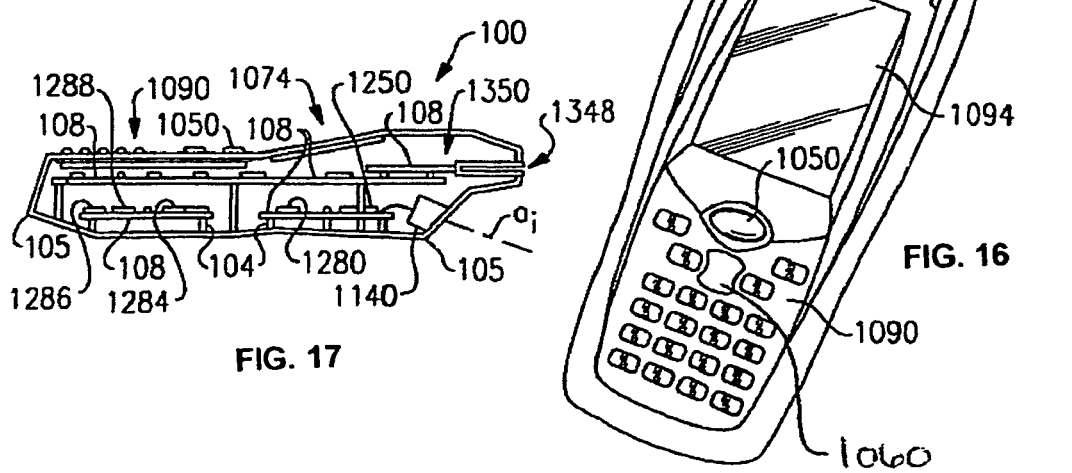
FIG. 17
FIG. 16

HIGH-EFFICIENCY ILLUMINATION IN DATA COLLECTION DEVICES

FIELD OF THE INVENTION

The present invention relates to data collection devices containing high-efficiency illumination sources, and to their uses.

More particularly, the present invention relates to bar code scanners, portable data terminals, transaction terminals, bar code verifiers, and similar data collection devices containing light-emitting diodes having enhanced light energy throughput, and to their uses.

BACKGROUND OF THE INVENTION

In recent years significant advances have been made in the art of data collection devices and networks containing the same.

In U.S. Pat. No. 5,900,613, a data collection device system is described having a data collection device adapted to read bar code data wherein the data collection device is in communication with a local host processor and a remote host processor. The data collection device is configured to report bar code data to a remote computer and execute reprogramming routines to receive program data from either or both of the remote host processor and the local host processor.

In U.S. Pat. No. 6,298,176, a data collection device system is described having a bar code reading device and a host computer. The bar code reading device is equipped to send bar code data and associated image data to the host. The image data may contain digital images associated with transmitted bar code data. In one example, image data sent to a host includes image data representing a handwritten signature.

In U.S. Publication No. US2002/0171745, a data collection device system is described having a bar code reading device which is in communication with a remote computer. The bar code reading device sends image data and associated bar code data to the remote computer. In one combined bar code/image data transmission scheme, an image data file in .PDF, .TIFF, or .BMP file format is created at a data collection device which includes an image representation of a decoded bar code message and an image representation of the package including the bar code encoding the decoded message.

In U.S. Publication No. US2003/0132292, a data collection device is described having a data collection terminal including a bar code reading unit, an RFID reading unit, a mag stripe data reading unit, a chip card reading unit, and a fingerprint reading unit. The terminal is part of a data collection system, which is configured to facilitate financial transactions involving data collected utilizing the various reading units.

U.S. Pat. No. 6,832,725 describes an optical reader imaging module that includes a first circuit board carrying a two dimensional image sensor; a second circuit board; a support assembly between the first and second circuit boards; an aiming system for projecting an aiming line using LEDs mounted on the first circuit board; and an illumination system for projecting an illumination pattern on a target area using illumination LEDs on the second circuit board. The aiming LEDs are selected to emit light in a different visible color relative to a visible color emitted by the illumination LEDs.

The above documents are generally directed to 2D imagers; however, the present invention is also applicable to 1D imagers. Such an imager is described, for example, in U.S. Pat. No. 6,119,939, which is directed to an optical assembly for use in a reader having an optical axis. The assembly includes a support frame having a rear housing containing a solid state imager; a single imaging lens mounted in the frame for focusing a target image upon the solid state imager along a linear optical axis; an illumination unit mounted in coplanar alignment on each side of the frame (each unit containing at least one lamp mounted behind a field stop aperture); and a cylindrical illumination lens mounted in front of each field stop aperture, for focusing a horizontal line of light upon a target in barcode space.

The disclosures of the above patents and published patent application are hereby incorporated in their entireties by reference thereto.

In current hand held data collection devices, which include corded and cordless bar code scanners, portable data terminals, transaction terminals (including price checkers), and bar code verifiers, light-emitting diodes (LEDs) can be used as indicators (for example, a "good read" indicator), and more importantly, for illumination.

Illumination can take two forms; aiming (also called targeting) illumination, and acquisition illumination. In the case of aiming illumination, an optical system projects a user-visible alignment indicator that assists in optimizing the spatial relationship between the imaging system of the data collection device and the target indicia, in order to facilitate image acquisition. For example, using one or more LEDs or a laser diode together with an appropriate optical system, the user may see cross-hairs, corner brackets, one or more dots, a line, or combinations of these, projected onto the substrate bearing the target indicia. These provide visual feedback to the user to assist in placing the imaging system of the data collection device and the target indicia into an acceptable read position relative to each other.

In the case of acquisition illumination, LED illumination is projected towards a target, such as a bar code indicia on a substrate, and the resulting scattered light from the target passes through the optics of the data collection device to impinge on the sensor array. This sensor array may be a linear (1D) array; or, a row-and-column (2D) matrix, such as a CCD or CMOS device. As used herein, the term "light" means those electromagnetic wavelengths produced by the LED, including but not limited to wavelengths in the visible spectrum. While conventional data collection devices employ visible light, and primarily white, red, blue, and/or green, for targeting and image acquisition illumination, this is not a requirement, and depending on the environment of use and overall system capabilities, other wavelengths or portions of the spectrum, both visible and invisible such as infrared and ultraviolet, may be used as well.

The amount of light, both ambient and that generated by the data collection device, is an important factor in its performance. With regard to light generated by the device, the amount of light and the amount of power required to produce it are factors in whether an image can be acquired at all (for example, under low light and/or long range conditions); in the time needed to acquire the image (for example, higher illumination can improve contrast levels, decreasing the time needed to recognize and/or acquire an image, or conversely can produce glare or specular reflection, impairing image detection and acquisition); in the quality of the image acquired; in whether it is necessary or desirable to alternate or combine the use of aiming illumination and acquisition illumination sources; and, in the case of a battery-powered device, in balancing power conservation with performance. When reading 2D symbologies the aiming illumination is usually turned off when an image is being acquired in order to ensure a constant illumination over the field of view. This may also improve power conservation. When reading 1D bar code symbols or some 2D bar codes on the other hand, conditions such as low ambient lighting, relatively large distances, and relatively poor quality of the indicia may favor leaving the aiming illumination on when the acquisition illumination is energized, effectively turning the aiming illumination into an auxiliary form of acquisition illumination in order to maximize the light reaching the target indicia.

These often conflicting needs can force a choice that sacrifices one interest for the other, and may prompt additional hardware and software expense and complexity in the design and operation of a data collection device in an attempt to balance the competing factors or provide the user with a range of options.

Accordingly, there is a need for further advances in data collection devices, specifically regarding the sources and uses of the illumination used for aiming and acquisition.

SUMMARY OF THE INVENTION

A hand held data collection device, such as a bar code scanner, portable data terminal, transaction terminal, or bar code verifier, containing at least one light-emitting diode (LED) that has been modified to improve the efficiency of light energy transmission. The modification involves transition features at the interface between the LED die surface and the ambient environment. Devices using such modified LEDs may offer a number of advantages such as extended read range, decreased read time, and improved battery life.

BRIEF DESCRIPTION OF THE DRAWINGS

For a further understanding of these and other objects of the invention, reference will be made to the following detailed description of the invention which is to be read in connection with the accompanying drawings, where:

FIG. 13 is a partial view of an alternative embodiment of the electrical circuit shown and described in FIG. 11;

FIG. 14 is a front perspective view an assembled imaging module which may be incorporated in a data collection device according to the invention;

FIG. 15 is an exploded assembly view of the imaging module shown in FIG. 14;

FIG. 16 is a top unit of a data collection device according to the invention including an imaging module, an RFID reader unit, and a card reader unit;

FIG. 17 is a cutaway side view of the data collection device shown in FIG. 16 incorporated in a hand held housing;

DETAILED DESCRIPTION OF THE INVENTION

Figure 1A:
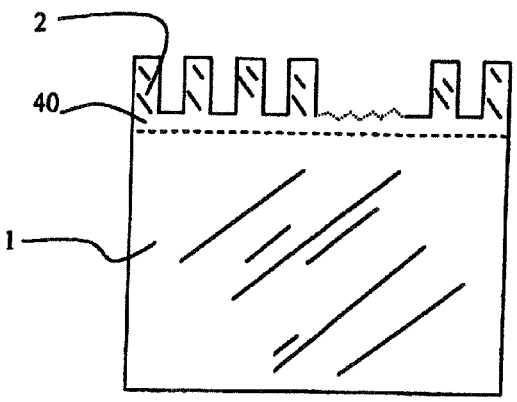
FIGS. 1a and 1b are side views of an LED die surface containing transition features of the present invention.

These and other problems may be addressed by the use of LEDs having significantly improved light energy transmission efficiencies. In current LEDs, a significant portion of the light that is initially generated either does not leave the LED, or does not reinforce the primary output, that is, it may be emitted at an angle or angles divergent from that of the main output, and so does not contribute significantly to that output. This happens at least in part because the interface between the LED material and the ambient environment leads to refraction of some of the light waves. The index of refraction can be sufficiently large that 30%, 50%, or even more of the light generated in the LED fails to join the main output and so serves no useful purpose, or at least not the primary intended purpose of aiming or acquisition illumination. Therefore, a significant amount of the light generated in the LED, and a significant amount of the power being used to energize the LEDs, is simply wasted.

At normal incidences, the reflectance, or fraction of light energy reflected at the boundary between two materials with different refractive indices n1 and n2, is represented by the formula $$R = \left(\frac{n_1 - n_2}{n_1 + n_2}\right)^2.$$

This expression is derived for the general case of non-normal incidence; see, for example, Hecht, Eugene, *Optics*, 2d ed., Addison-Wesley, Reading, Mass. 1990. Gallium arsenide, a common material used in forming LED dies, has a refractive index of approximately 3.66. This may interface with a typical optical epoxy adhesive such as OPT 5012, available from Intertronics of Kidlington, Oxfordshire, England, which has a refractive index of approximately 1.56. With this combination of materials the reflection coefficient becomes approximately 0.16, meaning that 16% of the light energy is reflected at the semiconductor-epoxy interface. If air replaces epoxy at the interface, the situation becomes much less favorable because the reflectance becomes 0.33, that is, 33% of the energy is reflected at the interface.

The critical angle for total internal reflection for light traveling from a material having a higher refractive index (medium 1) to a material having a lower refractive index (medium 2) is given as $$\frac{n_2}{n_1} = \sin\Theta_c.$$

Looking again to the combination with light traveling from a gallium arsenide die to an optical epoxy adhesive, this becomes $$\frac{1.56}{3.66} = \sin\Theta_c,$$

yielding a value for $\Theta_c$ of 25°. In the system where gallium arsenide interfaces to air, the critical angle becomes $$\frac{1}{3.66} = \sin\Theta_c,$$

yielding a value for $\Theta_c$ of 15.8°.

All light incident on the surface at an angle exceeding the critical angle will be internally reflected at 100%, and thus not exit the LED die. It is anticipated that the present invention will reduce this undesirable effect by modifying the interface at the boundary between the two materials having differing refractive indices.

These light energy losses can be reduced by modifying the boundary region at the interface between the LED die surface and the ambient environment in a manner that reduces the refractive/reflective diminution of the effective light energy output. Such modification may be accomplished by either or both of modifying the upper surface of the LED, and modifying the ambient environment tangential to the LED surface, by adding or creating microstructures or transition features to one or both. See, for example, K. Hadobás et al., "Reflection properties of nanostructure-arrayed silicon surfaces", *Nanotechnology* 11 (2000): 161-164; M. P. Houng et al., "Extremely low temperature formation of silicon dioxide on gallium arsenide", *Journal of Applied Physics* 82.11 (1997): 5788-5792; W. Sui et al., "The Improvement of Extractive Emission in InGaAlP Quantum Wells Light Emitting Diodes by Microstructures", *Journal (Natural Science) of Peking University* 39.3 (2003): 331-335; C. Sun et al., "Enhancement of light extraction of GaN-based light-emitting diodes with a microstructure array", *Optical Engineering* 43.8 (2004): 1700 et seq.; T. Lee et al., "Analysis of position-dependent light extraction of GaN-based LEDs", *Optics Express* 13.11 (2005): 4175-4179; and D. Kim et al., "Enhanced light extraction from GaN-based light-emitting diodes with holographically generated two-dimensional photonic crystal patterns", *Applied Physics Letters* 87 (2005): 203508-203510, the disclosures of which are hereby incorporated in their entireties by reference thereto.

These transition features may be created as part of the manufacture or formation of the LED, so that the LED as manufactured includes the transition features. Alternatively, the LED may first be manufactured, and then modified by the addition of transition features. The transition features may be created in the surface of the LED, as by etching; or by deposition (such as liquid phase deposition) onto that surface; or by addition of one or more (sacrificial) layers onto the surface, which are then etched or modified as by deposition; and by any combination of these. It may also be created by bonding to the surface of the LED a second material or layer of material which has been preprocessed or is then processed to contain the desired features. The transition features may be of the same material as the LED, or different. When the LED surface is bounded by an adjacent non-gaseous material, the transition features may be of the same material as the adjacent material.

The transition features may take the form of voids extending down into the surface, projections above the surface, or both. In other words, the transition features may constitute positive and/or negative features relative to the surface of the LED.

In either case the voids and projections may be of any regular or irregular shape. Thus, the cross-sections of these transition features may be strictly linear (such as triangular, square, rectangular, star-shaped, or more generally any regular or irregular polygon); strictly curvilinear, with or without a constant radius of curvature (such as circular, oval, or elliptical); or any combinations thereof (such as hourglass or dome). The transition features may be regular geometric shapes such as cones, pyramids, cylinders, spheres, hemispheres, toroids, prisms, cubes, and other solid regular and irregular polygons (including truncated versions such as frustoconical and frustopyramidal), or have irregular shapes or profiles (such as barbell and dumbbell). The sides of the transition features may run parallel, as with a cube or cylinder; converge, as with a cone or pyramid; or diverge, as would be the case with a cone or pyramid oriented "top down" relative to the surface of the LED.

For those transition features having one axis longer than another (as opposed, for example, to a cube or sphere), the longer axis may be oriented normal to, or parallel to, the LED surface. Thus, a cylindrical transition feature having a diameter d and a height h greater than d may be oriented "on end" so that its longer axis h extends normal or substantially normal to the LED surface, or may be "on its side" so that the long axis h runs parallel or substantially parallel to the LED surface, and may further be mounted on a pillar or other support so that it lies above the surface of the LED. Similarly, where the transition features have converging or diverging geometries such as cones and pyramids, they may have either orientation with respect to the surface of the LED die. That is, the base of the cone or pyramid may be closest to the surface of the LED die, or the transition feature may be inverted such that the cone or pyramid is upside-down or standing on its point relative to the surface of the LED.

Any orientation between these two points is also possible, for example, the transition features could include post or towers extending above the LED surface, or cylindrical tunnels extending into the LED surface, at an angle of 5, 15, 20, 25, 30, 45, or 60 degrees compared to a line normal to the LED surface, or any other angle.

The transition features are scaled to have dimensions that are either sub-wavelength, or non-integer multiples of wavelength. It is required that they have at least one dimension that is less then a wavelength of the light being emitted by the LED, and will typically have a dimension that is less than half such a wavelength. For example, with reference to a transition feature having one or more of diameter d, length l, and width w, in each case running substantially parallel to the LED surface, these dimensions would have a size in the range of from about $\lambda/10$ to about $\lambda/4$, while the height h of the transition features (such height involving a side running substantially perpendicular to the LED surface) would be in the range of from about $\lambda/5$ to about $\frac{7}{8}\lambda$.

Figure 7:
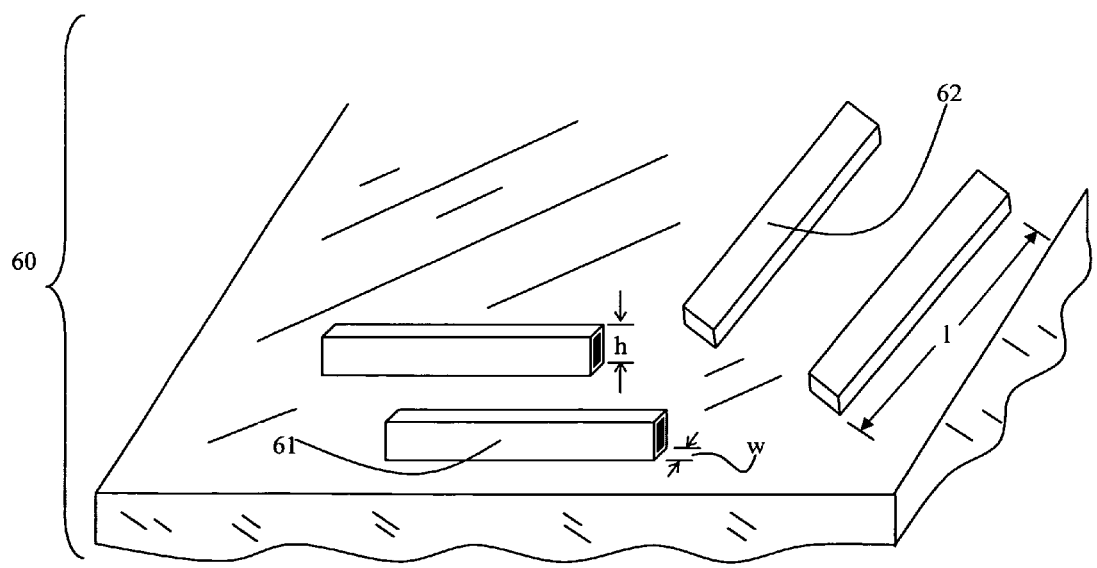
FIG. 7 is a view of a further alternative transition feature array according to the present invention.
Figure 8:
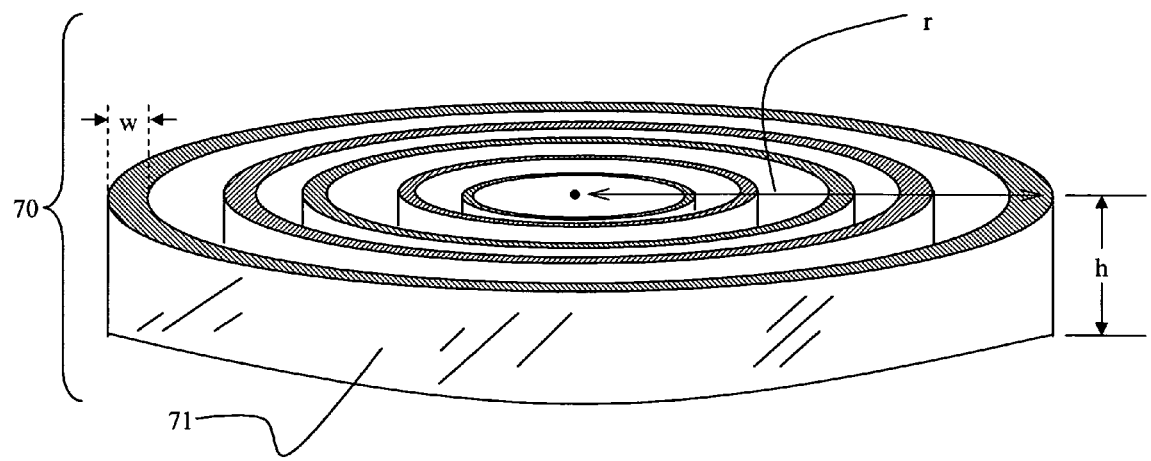
FIG. 8 is a view of a concentric-type transition feature array according to the present invention.

Alternatively, for a transition feature having a length L running substantially parallel to the LED surface, such as element 61 in FIG. 7, the dimension of L may be longer than the subject wavelength, even much longer, as may the radii of the arcuate elements 71 in FIG. 8.

The light emitted by the LED could have, for example, a wavelength of from about 0.4 to about 1.0 microns, or about 400 to about 1,000 nm. Therefore, and also by way of example, a given transition feature could have any of a diameter, length, and/or width in the range of from about 40 or about 100 nm at the low end of the range (applying the factor of $\lambda/10$), to about 100 or about 250 nm at the high end of the range (applying the factor of $\lambda/4$).

The transition features may each consist of more than one portion, and each portion may be the same or different. Thus, there may be an upper and lower portion, each of which may be any of the shapes discussed herein, and the upper and lower portions may be contiguous or joined by one or more intermediary portions (for example, a barbell or dumbbell shape may be thought of as upper and lower spherical portions joined by a cylindrical intermediary portion). In general the bottom portion will have at least one dimension that is less than at least one dimension of the associated top portion, for example, the bottom portion may be a column of diameter d while the top portion is a sphere or hemisphere of diameter greater than d, or otherwise has edges or sides that project laterally beyond the periphery of the column. Moreover, the height of the lower portion may range from less than a wavelength of the emitted light to several wavelengths. The bottom and top portions may be of the same or different materials, such materials including conductors, semiconductors, and insulators. Where the transition features consist of or include voids in the LED surface, those voids may be partly or completely filled with a fluid or solid material having an index of refraction that results in the improved transmission of light energy from the LED.

The transition features may extend over any portion of the LED surface up to and including the entire surface. They may consist of a single array on a portion of the surface, or of several arrays arranged in regular or random sequence on the surface. Examples of regular sequenced arrays include a checkerboard pattern, where arrays of transition features (which arrays may be polygonal, round, oval, elliptical, and so on) alternate with portions of the LED surface (similarly of any shape), and the transition feature arrays and surface portions may be of the same or different sizes, and within themselves may be of constant or varying size, and such varying size may follow a constant or random progression. Where less than all the surface of the LED contains transition features, the ratio of modified to unmodified surface may be in any proportion.

The above discussion will now be supplemented by reference to certain specific embodiments and examples, which are illustrative only and not limiting on the scope of the invention.

Figure 1B:
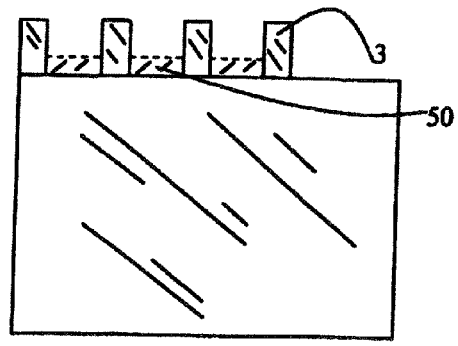

FIGS. 1a and 1b are side views of an LED die including transition features according to the present invention. In FIG. 1a, transition features 2 are formed in material 40 which may be the same material as the LED die or, as indicated by the broken line, may be of a different material. Where the transition features are formed of a different material, they may project out of (or into) a uniform base layer of that material as shown in FIG. 1a, or they may project completely through that material as shown in FIG. 1b. In FIG. 1b, transition features 3 may have the form of simple posts or columns having their bases on the LED die, in which case they may be of the same material as the LED die or of a different material. Alternatively, there may be a layer of a material 50, being different from the die material and the material of the transition features, having a thickness less than the height of transition features 3. This layer may, for example, be added following the initial formation of transition features 3.

Figure 2A:
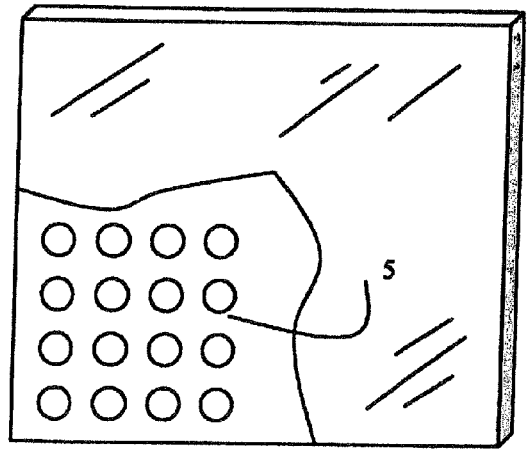
FIGS. 2a-2c are top views of an LED die surface containing transition features of the present invention.
Figure 2B:
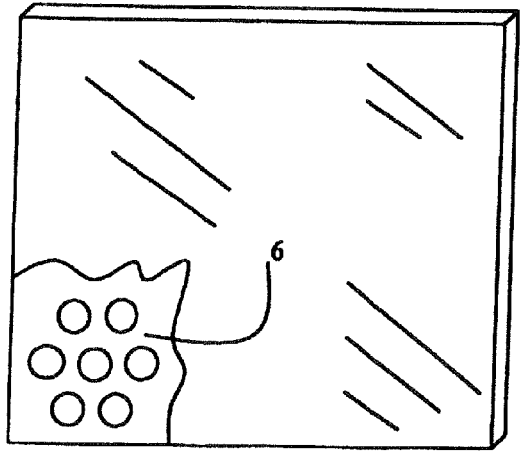
Figure 2C:
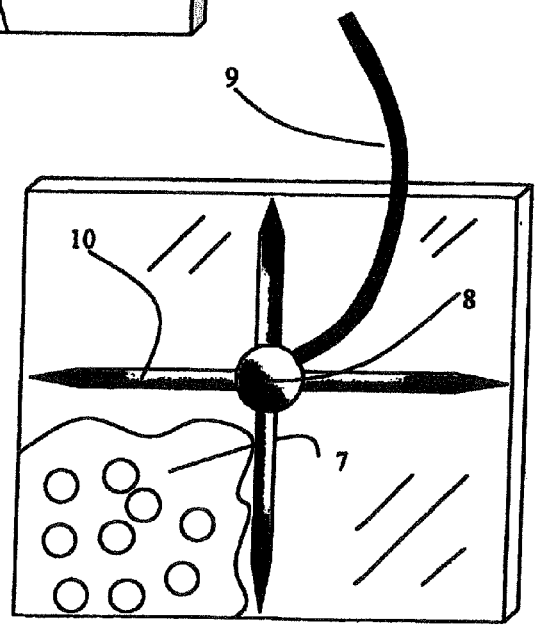

FIGS. 2a-2c present a top view of transition features of the present invention. Here, elements 5 are located on a rectilinear grid, elements 6 are on a hexagonal grid, and elements 7 are more randomly located. An electrical connection is made to current distribution conductor 10 on top of the die with wire 9 bonded to pad 8. Current is distributed through conductive patterns 10, which may be above, or below, transition features 5, 6, or 7. As discussed with respect to FIGS. 1a and 1b, the material of the transition features could be fabricated into the LED die semiconductive material itself, of formed from a different material.

Figure 3:
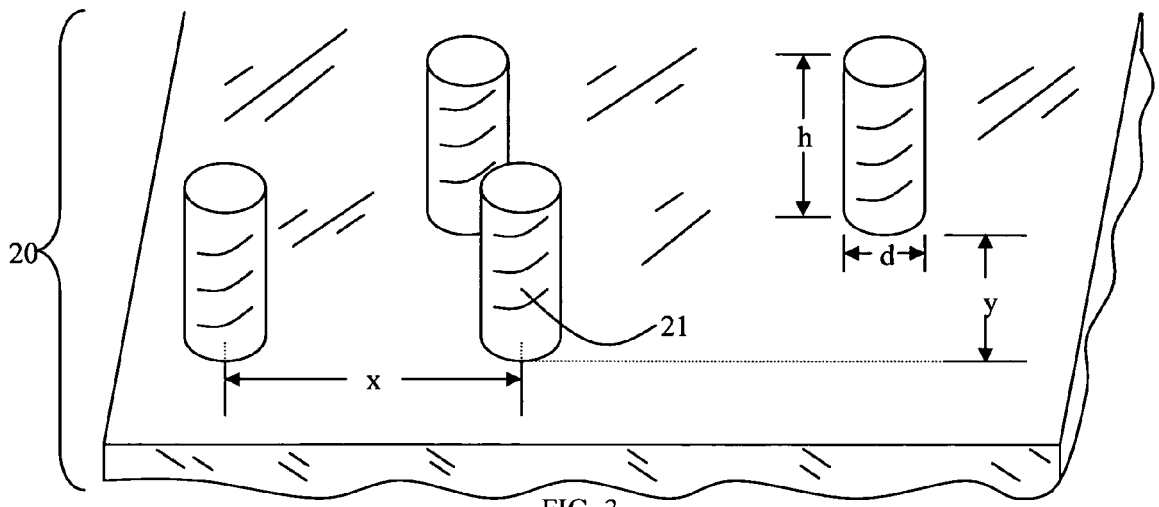
FIGS. 3-5 are views of various embodiments of transition feature arrays according to the present invention.
Figure 4:
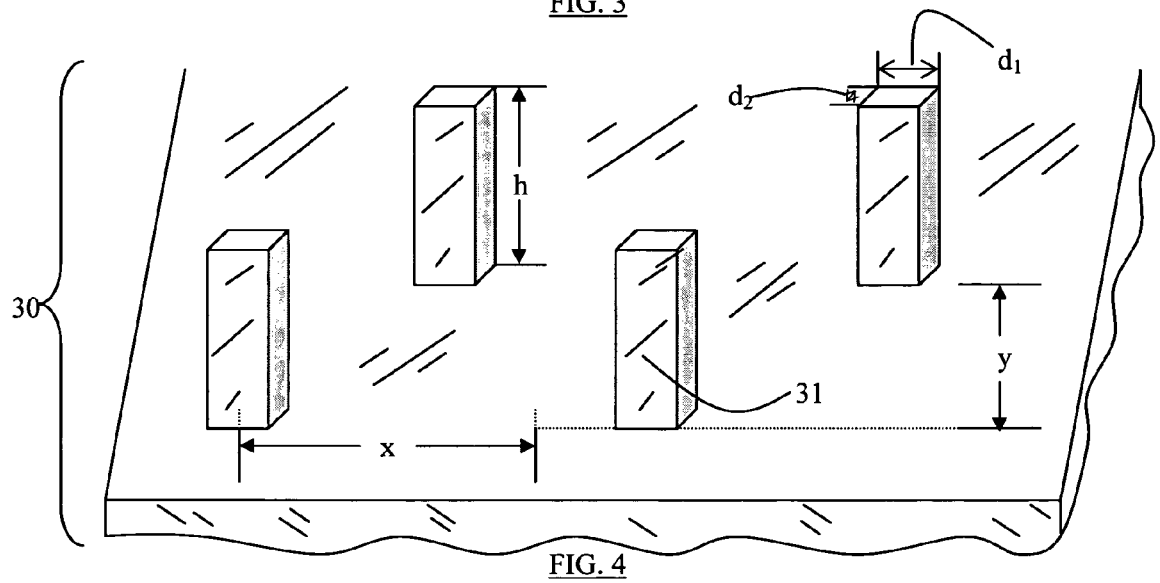
Figure 5:
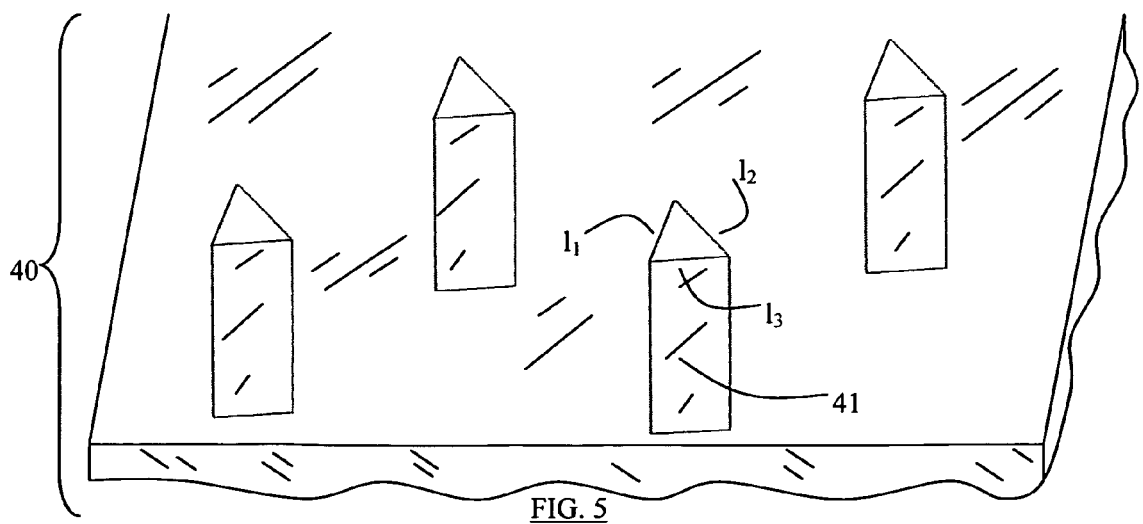

With reference to FIGS. 3, 4, and 5, the transition features shown in arrays 20, 30, and 40 are shown as posts. The posts may have various shapes, such as columns 21 having diameter d and height h. They may also be square or rectangular in profile, as shown with elements 31, having major dimension $d_1$-$d_2$ and height h. Similarly, the transition features may be an array 40 of triangularly-shaped elements 41 having sides with lengths l1, l2, and l3. The angles between the three sides can be the same or different. Other profiles are envisioned such as hexagonal, oval, and combination of shapes.

Figure 6:
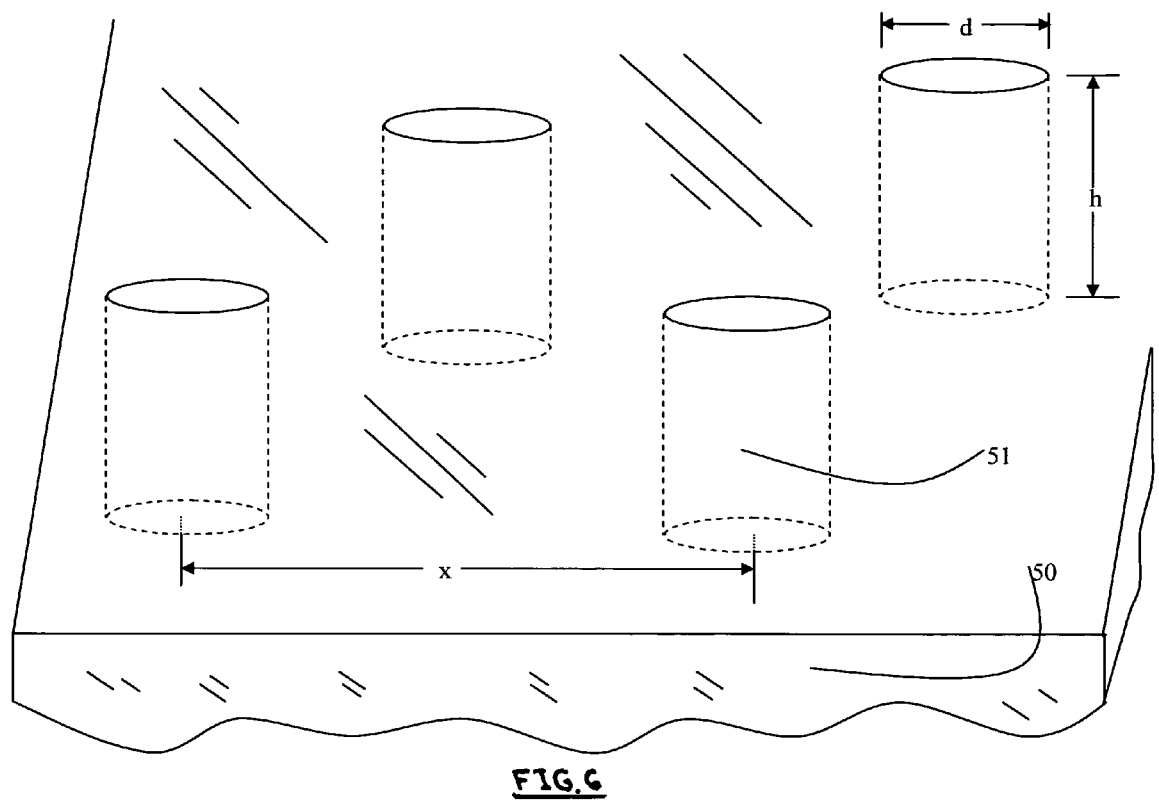
FIG. 6 is a magnified view of an alternative transition feature array according to the present invention.

Referring now to FIG. 6, the array of transition features may also consist of holes or depressions 51 in substrate 50. While elements 51 are depicted as cylindrical, they may have any shape or form as earlier discussed. Thus, an element may have two or more portions, such as a base and a top, which may be the same, as in a smaller rectangular solid atop a larger one, stacked 'skyscraper style'; or different, as in a sphere atop a rectangular solid base portion. In short, the examples provided herein are merely illustrative, and any shape or shapes that accomplish the transitional function of these features may be used.

FIG. 7 shows an array 60 of rectangular elements 61 and 62, having a length l, height h, and width w. As discussed above, other shapes may be contemplated, as well as other orientations; for example, the rectilinear elements 61 and 62 may be normal to each other as shown, or at a greater or lesser angle. The size of the elements may also be varied; for example, elements 61 could all be of one size and elements 62 all of another; or, either or both of elements 61 and elements 62 could vary in size from one to the next, in either a regular or random pattern.

FIG. 8 shows an array 70 consisting of concentric circular transition features 71 having a height h, diameter r, and width w. These features may also be oval, elliptical, or any other arcuate shape such as segments of circles or ovals. Alternatively, while maintaining their concentric relationship, the transition features may take form of squares, rectangles, triangles, or other rectilinear or polyhedral shapes.

Figure 9:
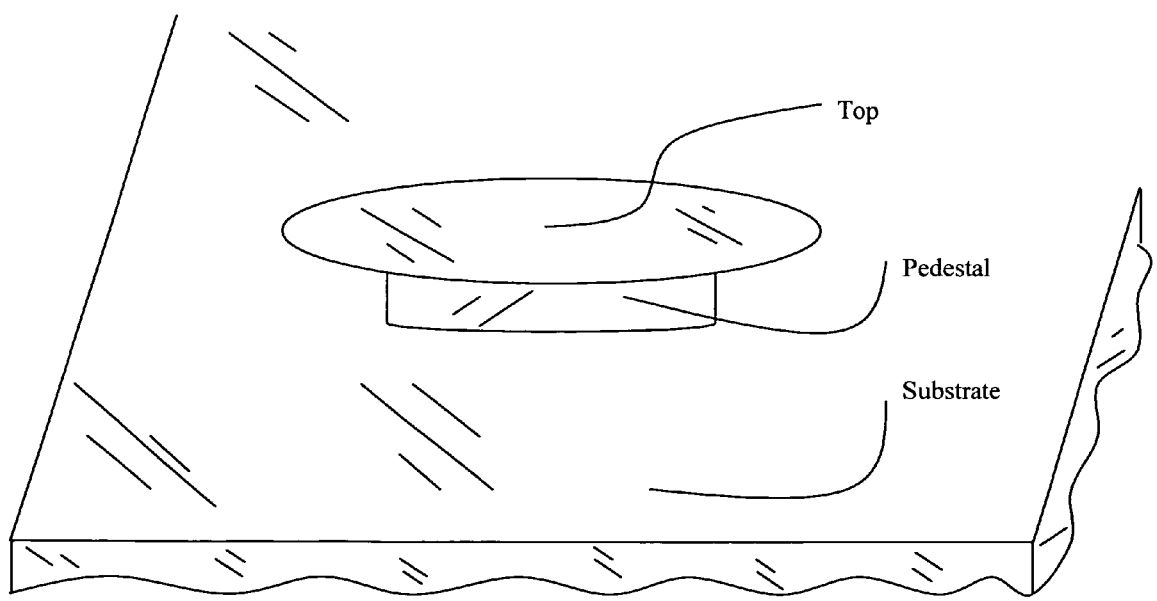
FIG. 9 is a view of an individual transition feature according to the present invention having multiple portions.

FIG. 9 represents an embodiment wherein the transition feature includes at least a top portion and a bottom portion, where the bottom portion is a column, cylinder, or pedestal, and the top portion has a diameter or circumference larger than the bottom portion, in this case a 'mushroom' configuration resulting from the top portion taking the form of an ellipsoid or flattened sphere.

Figure 10A:
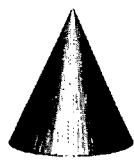
FIGS. 10a-p are various alternative geometries for individual transition features.
Figure 10B:
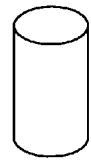
Figure 10C:
Figure 10D:
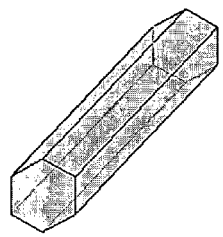
Figure 10E:
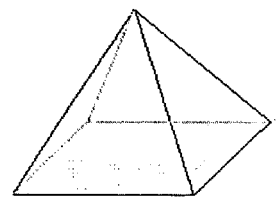
Figure 10F:
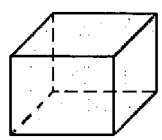
Figure 10G:
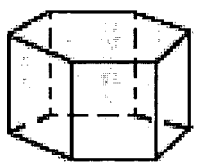
Figure 10H:
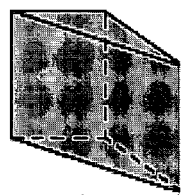
Figure 10I:
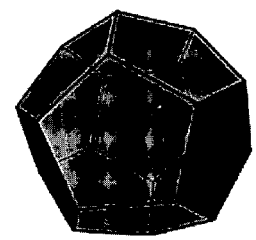
Figure 10J:
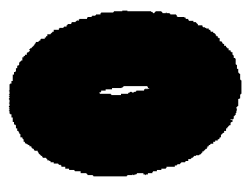
Figure 10K:
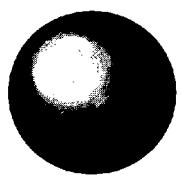
Figure 10L:
Figure 10M:
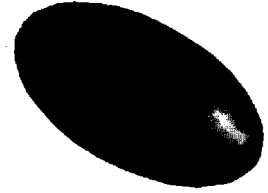
Figure 10N:
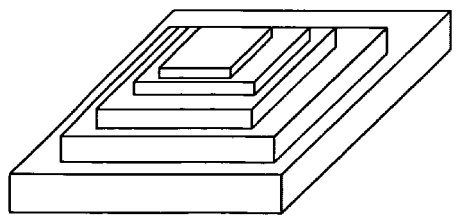
Figure 10O:
Figure 10P:
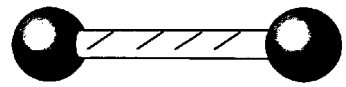

FIGS. 10a-10p shows examples of transition feature geometries. FIGS. 10a-10m show elements that would either constitute transition features per se, or portions of transition features having multiple portions, such that two, three, or more individual elements may be combined, either with each other, or with elements that are of the same geometry, and that are of the same or a different size. FIGS. 10n-10p show examples of some multi-portion transition features, where FIGS. 10n and 10o show transition features where more than one of the same element are combined (here of different sizes), while FIG. 10p shows a three-part transition feature in which a central cylindrical portion is combined with two spherical portions to form a dumbbell or barbell shape.

All transition features shown as being above the die surface may alternatively take the form of a void or hollow in the surface, as shown in FIG. 6. All transition features depicted herein represent features at the transition between two materials; this transition may be metal or semiconductor to air, but also may be to a different gas, or metal to metal oxide, or a semiconductor to a different semiconductor, metal, or insulator. All of these materials will have different indices of refraction; note that for a homogenous medium, the index of refraction is related to the electric permittivity ∈ and magnetic permeability μ through the relationship shown below. The dimensions of the forgoing features may be calculated relative to the wavelength of light in either material. It is appreciated that the index of refraction will be different for the two materials and thus the wavelength of light will be correspondingly different in the two media and the optimization of the feature sizes may have to be done empirically:

$$n = \sqrt{\epsilon \mu}.$$

While the primary purpose and effect of modification with transition features as described herein will be to increase the effective output of light energy, the transition features may also provide the LED output with an intensity pattern or profile, and/or have lensing or spectral filtering effects. An intensity pattern or profile would result from modifying less than all of the LED surface with transition features, so that more of the light energy would be emitted only from a selected portion of the LED. In this way the LED output could be directed more selectively; by rough analogy, it could be turned from a floodlight into a spotlight, and the light output, or at least the primary or stronger light output, could be limited to a certain portion of the overall field of illumination. For example, for some reasons it may be desirable to use a configuration where the LEDs and the lens of the data collection device lie in the same line, while considerations such as reduction of specular reflection may make it desirable to have the acquisition illumination impinge the target indicia at an angle relative to the optical path of the data collection device. Selective placement of transition features on the LED surface could allow both goals to be realized in the same configuration. Spectral filtering through selection of transition features having the necessary characteristics could enable emission of red, green, blue, or other colored light from a less-expensive white-light LED.

Additional advantages may be realized by the use of LEDs having increased efficiency of light energy transmission in data collection devices. For example, let x represent the amount of energy required to power a non-modified LED or LEDs in a data collection device to produce a given amount of illumination for a given unit of time. The use of modified LEDs will permit the use of less energy to generate the same light output. Similarly, let y represent the amount of energy required to power a modified LED (or LEDs) in a data collection device to produce a given amount of illumination from a given amount of energy. Then, if x−y represents the lesser amount of power needed to power a modified LED array to achieve the same amount of illumination for the same amount of time as the non-modified array, the differential x−y is available either for diversion to other uses, or simply for power conservation and to prolong battery life. Alternatively, a modified LED or LEDs could be powered to produce its full potential light output, but part of that output could be diverted to a use other than acquisition illumination, such as backlighting a display, or illuminating a portion of the interior or exterior housing (such as by using optic fibres or light pipes). Alternatively, the modified LEDs could be used directly to light or backlight a display or illuminate a portion of the interior or exterior housing. The higher level of illumination made possible with a modified LED or LEDs provides a greater dynamic range of illumination, which could be exploited through feedback control to enable a greater range of adjustment based on ambient conditions.

Thus, the level of illumination may be adjusted based on the intensity and/or type of ambient lighting present. A lower level of illumination will generally be desirable in sunny or otherwise brightly lit environments, while a higher level of illumination will generally be desirable in cloudy, nighttime, or otherwise poorly lit conditions. Feedback control may also be used to reduce the amount of power required to obtain a good read or image acquisition, which is most useful in the cases of cordless/battery-powered devices. For example, when the device is first actuated or triggered, the initial illumination level could be low, and if the low level of illumination is insufficient to resolve the target sufficiently, feedback control could be used to increase the level of illumination as necessary, either continuously or step-wise, until a good read is obtained. Alternatively, the device may be configured to store the level of illumination resulting in a good read for later use; for example, when a period of active reading ends, or the device is powered off, the system could store a value corresponding to the last such level of illumination, and restore that level upon the next use of the device. In another embodiment, the device could correlate illumination levels resulting in good reads with time of day as obtained from an internal or external time source, and use this information to set an appropriate level of illumination when the device is next used at that same time of day; this would perhaps be most applicable to outdoor use. When glare or specular reflection are possible, feedback control may be used to decrease or increase the level of illumination, thereby decreasing the amount of glare or specular reflection, until a good read is obtained.

In addition, it should be possible to reduce the size of the LEDs while maintaining the same or substantially the same effective light output as an unmodified LED, thereby increasing available space inside the housing of the data collection device, reducing weight, and/or permitting reduction of the overall size of the device.

The following is a more detailed explanation of the types of devices in which the present invention may be employed, including their environments of use.

Figure 11:
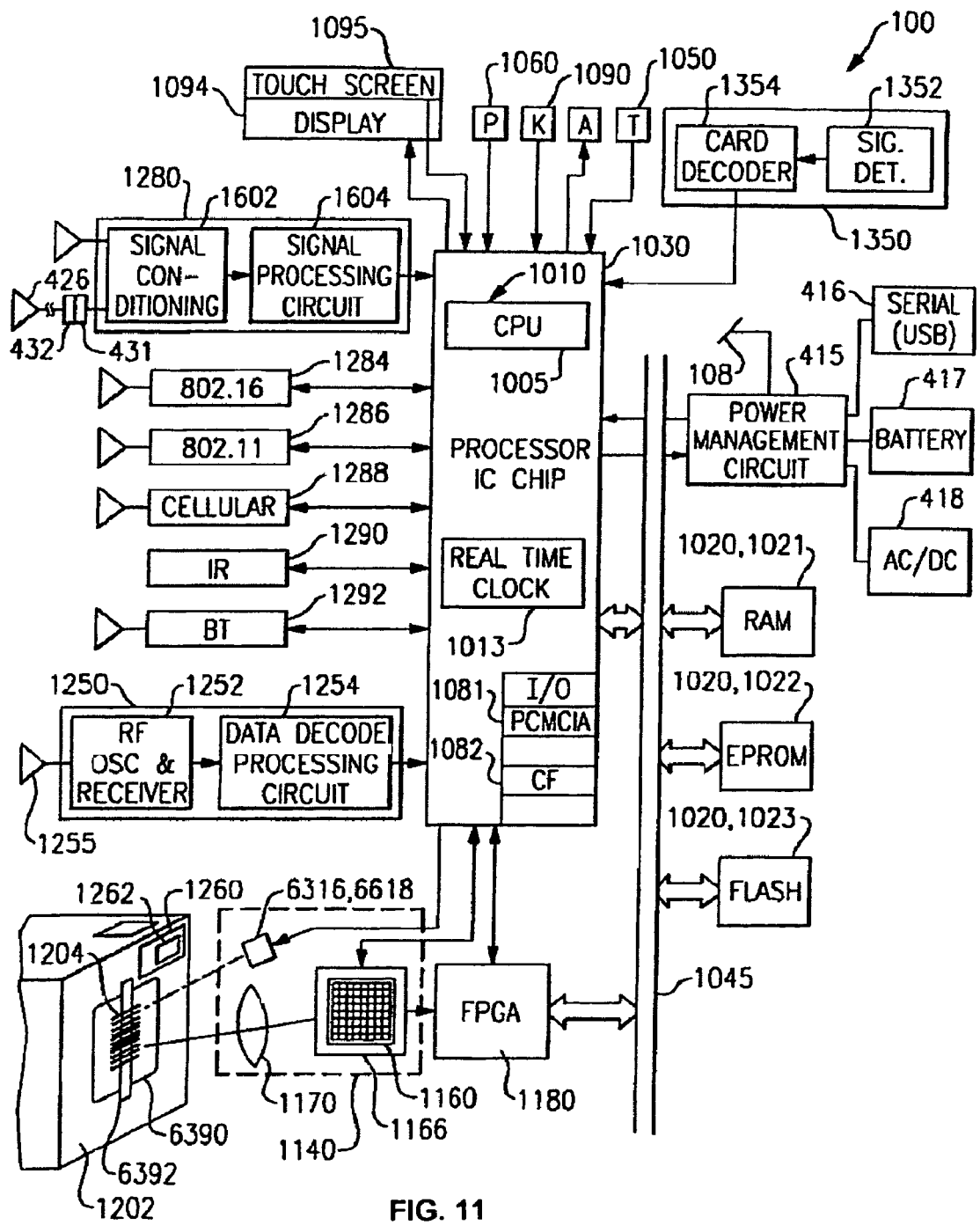
FIG. 11 is a block diagram of a mobile data collection device according to the invention.

A block diagram of a data collection device 100 invention is shown in FIG. 11. By operation of a control circuit 1010, device 100 receives and processes various input such as location information data and transaction data, and controls various output such as the output of various collected transaction data. In the embodiment of FIG. 11, control circuit 1010 includes a central processing unit or CPU 1005. CPU 1005 may be disposed on processor IC chip 1030, while memory 1020 may be incorporated partially in IC chip 1030 and partially in a plurality of memory IC chips such as EPROM IC chip 1022, RAM IC chip 1021, and flash IC chip 1023 or other nonvolatile storage device that may be in communication with microprocessor IC chip 1005 via system bus 1045. Processor IC chip 1030 operates in accordance with an Operating System (OS) which is typically loaded into RAM 1021 when data collection device 100 is booted up. The device's operating system enables processor IC chip 1030 to recognize input from user input interface components, e.g., keyboard 1090, send output to output interfaces e.g., display 1094, schedule tasks, manage files and directories and control other components such as input/output devices. Examples of suitable operating systems for device 100 include WINDOWS XP, LINUX, WINDOWS CE, OSX.

Figure 12:
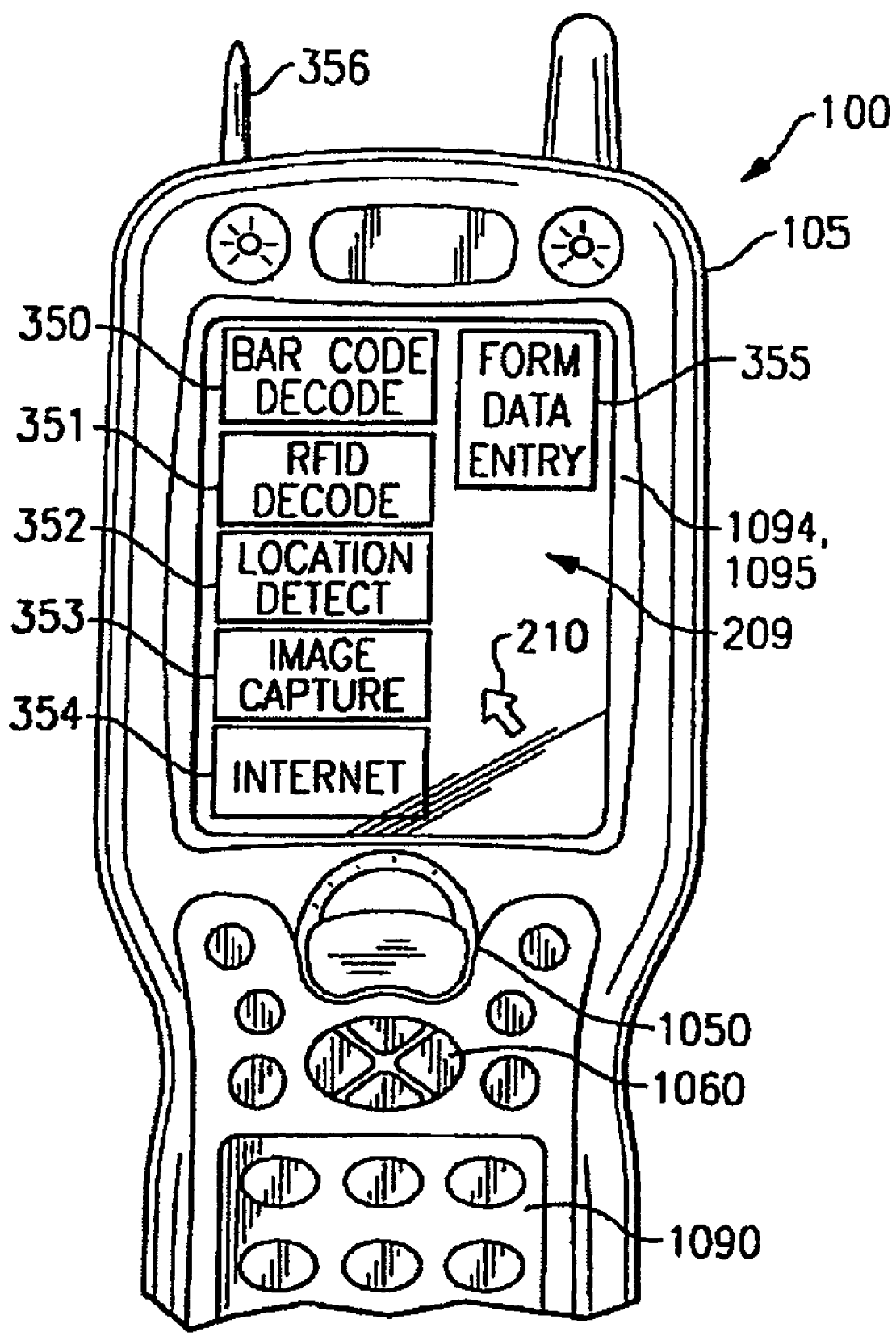
FIG. 12 is a physical view of a mobile data collection device according to the invention with GUI menu selection functionality.

Referring to further elements of device 100, device 100 includes a display 1094. Display 1094 may have an associated touch screen overlay 1095 so that display 1094 operates as a data input interface. The combination of display 1094 and touch screen overlay 1095 can be regarded as a "touch screen." Device 100 may further have a keyboard 1090 enabling input of data. Device 100 may also include a graphical user interface ("GUI") as illustrated in FIG. 12. GUI 209 includes a pointer 210. Pointer 210 is moved by an operator to select between various displayed (sometimes referred to as "virtual") control buttons displayed on display 1095. Pointer 210 may be moved during web browsing to select a text or icon hyperlink for highlighting. Control buttons may also be displayed for selecting between various menu options. Device 100 can be configured so that displayed menu options are selected by physically depressing a displayed icon or text, with use of a finger or stylus (not shown). As shown in FIG. 12, the control buttons may be a series of icons 350, 351, 352, 353, and 354. Selecting one of the icons changes the mode of operation of the device in accordance with the selected icon. Device 100 includes a pointer controller 1060, which may include an arrow navigation matrix, trackball, mouse, touchpad, or joystick, enabling movement of pointer 210. Device 100 further includes a trigger 1050 for controlling various data input units of device 100. Trigger 1050 is in communication with control circuit 1010.

Device 100 as shown in FIG. 11 also includes an image signal generating system provided by two dimensional solid state image sensor 1160, available in such technologies as CCD, CMOS, and CID. Two-dimensional solid state image sensors generally have a plurality of photosensor picture elements ("pixels") which are formed in a pattern including a plurality of rows and a plurality of columns of pixels. Device 100 further includes an imaging optics 1170 focusing an image onto an active surface of image sensor 1160. Image sensor 1160 may be incorporated on an image sensor IC chip 1166 having disposed thereon image sensor control circuitry, image signal conditioning circuitry, and an analog-to-digital converter. Device 100 may further include a field programmable gate array 1180 ("FPGA"). Operating under the control of control circuit 1010, FPGA 1180 manages the capture of image data into RAM 1021.

When trigger button 1050 of FIG. 11 is actuated with device 100 in a bar code decode mode of operation, control circuit 1010 automatically sends appropriate control signals to image sensor chip 1166. Image sensor chip 1166 in response thereto automatically exposes photosensitive pixels of image sensor 1160 to light and generates image signals. The image signals are thereafter automatically converted into digital values by image sensor IC chip 1166. The digital values are received by FPGA 1180 and transferred into RAM 1021 to capture an electronic image representation of a substrate 1202 carrying a bar code symbol 1204. In accordance with a bar code decoding program stored in ROM 1022, control circuit 1010 may attempt to decode a bar code symbol represented in the captured electronic image representation. Representative symbologies that may be decoded include 1D and 2D bar codes as well as optical character recognition (OCR) fonts. The electronic image representation captured into RAM 1021 may be an image map having a pixel value (gray scale, color scale) for each pixel of the image sensor.

In addition to having a decode mode of operation, device 100 may also be configured to include an image capture mode of operation. In an image capture mode of operation, control circuit 1010 captures an electronic image representation in response to trigger button 1050 being actuated without attempting to decode a decodable symbol represented therein. The captured electronic image representation may be one or more of (i) stored into a designated memory location of memory 1020, (ii) transmitted to an external spaced apart device via a wired or wireless network (not shown), automatically or in response to a user input command, or (iii) displayed on display 1094 automatically or in response to a user input command.

Imaging assembly 1140, which in the embodiment described thus far includes an image sensor chip 1166 and imaging optics 1170, may be an IMAGETEAM IT4x10/4x80 imaging module of the type available from Hand Held Products of Skaneateles Falls, N.Y., USA. Views of an IT4x10/4x80 imaging module are shown in FIGS. 14 and 15. Imaging module 1140 includes a first circuit board 6314a and a second circuit board 6314b. First circuit board 6314a carries an image sensor IC chip 1166 and aiming LEDs 6318. A support 6380 is fitted over first circuit board 6314a which has a retainer 6382 for carrying lens barrel 6340 which contains an imaging lens 1170. Support 6380 further carries slits 6343 for shaping light from LEDs 6318. With support 6380 mounted on first circuit board 6314a, second circuit board is fitted over support 6380. Second circuit board 6314b carries illumination LEDs 6316 and receives power via electrically conductive support posts 6384 that are in electrical communication with first circuit board 6314a. With second circuit board installed, optical plate 6326 is fitted over second circuit board 6314b. Optical plate 6326 carries a substantially uniform diffuser surface for diffusing light from illumination LEDs 6316 and lenses 6325 for imaging slits 6343 onto a substrate, e.g., substrate 1202 (FIG. 11). Illumination LEDs 6316 together with the diffuser surface of optical plate 6326 projects an illumination pattern 6390 onto substrate 1202. Aiming LEDs 6318 together with slits 6343 and lenses 6325 project an aiming pattern 6392 onto a substrate 1202 as indicated in the view of FIG. 11.

In another aspect, device 100 as shown in FIG. 11 may include an RFID reader unit, including an RF oscillation and receiver circuit 1252 and a data decode processing circuit 1254. RFID reader unit 1250 may be configured to read RF encoded data from a passive RFID tag, such as tag 1262, which may be disposed on article 1202. Further, reader unit 1250 may write data to tag 1262. Tag 1262 may also be incorporated into a financial transaction card, such as a credit card, a debit card, or an electronic benefits card.

Still further, device 100 may include a card reader unit 1350. Card reader unit 1350 includes a signal detection circuit 1352 and a data decode circuit 1354. Signal detection circuit 1352 receives an electrical signal from a card and data decode circuit 1354 decodes data encoded in the signal. Card reader unit 1350 may be configured to read more than one type of card, e.g., credit cards, customer loyalty cards, electronic benefits cards and identification cards such as employee identification cards and driver license cards, and to read card information encoded in more than one data format. One example of such a card reader is a Panasonic ZU-9A36CF4

Integrated Smart Reader, which may read any one of magnetic stripe data, smart card or Integrated circuit card (IC card) data, and RF transmitted data.

Figure 18:
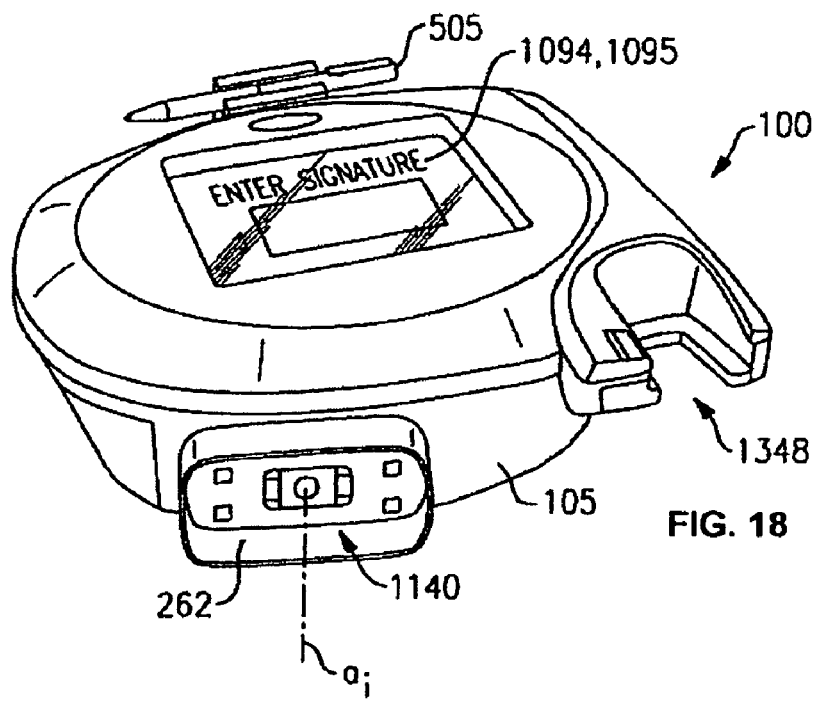
FIG. 18 is a front perspective view of a data collection device according to the invention incorporated in a portable and re-mountable housing and including an imaging module and a card reader.
Figure 19:
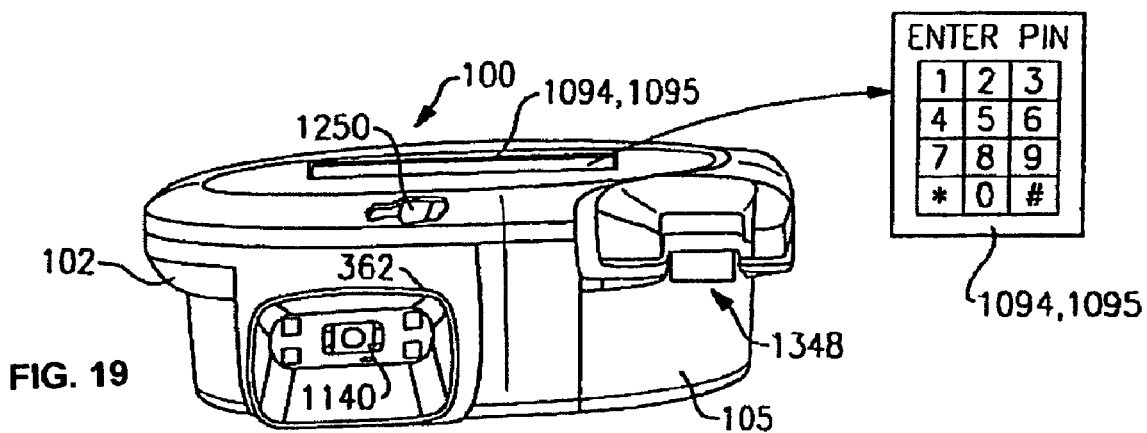
FIG. 19 is an alternative front perspective view of the portable and re-mountable transaction terminal data collection device according to the invention shown in FIG. 18.

In the embodiment of FIGS. 18 and 19, data collection device 100 is in the form of a transaction terminal which may be configured as a retail purchase transaction terminal or as a price verifier. Housing 105 of the transaction terminal shown in FIGS. 18 and 19 is configured to be portable so that it can be moved from location to location and is further configured to be replaceably mounted on a fixed structure such as a fixed structure of a cashier station or a fixed structure of the retail store floor (e.g., a shelf, a column). Referring to further details of data collection device 100, data collection device 100 may further include a luminous shroud 362. When light from imaging module 1140 strikes luminous shroud 362, the shroud glows to attract attention to the location of imaging assembly 1140. As indicated in FIG. 19, in certain operating modes data collection device 100 may display a PIN entry screen 1094 prompting a customer to enter PIN information into touch screen overlay 1095, or a signature prompt screen prompting a customer to enter signature information into the device with use of stylus 505.

Selection of various modes of operation may be made with use of a GUI 209 as is depicted in FIG. 12. GUI 209 displayed on display 1095 may include a plurality of control buttons in the form of selection icons, such as bar code decoding icon 350, RFID decoding icon 351, location detection icon 352, image capture icon 353, and web browsing icon 354. High level operating systems, such as WINDOWS CE, GNU/Linux, and Symbian support GUI functionality. Selection of one of the icons, 350, 351, 352, 353, and 354, drives device 100 into a mode of operation corresponding to the selected icon.

Referring again to the exemplary device of FIG. 11, Device 100 may further include a plurality of communication links such as an 802.16 communication link 1284, 802.11 communication link 1286, a communication link 1288 for communication with a cellular network such as a network in accordance with the Global System for Mobile Communications (GSM), a Bluetooth communication link 1292, and an IR communication link 1290 facilitating communication between device 100 and an external device spaced apart from device 100.

For mobile operation, device 100 is powered by a rechargeable battery 415 and, therefore, power conservation is important to the operation of device 100. Device 100 can be configured so that control circuit 1010 receives a trigger signal when trigger 1050 is depressed. Device 100 can also be configured so that a trigger signal is recorded by control circuit 1010 on receipt of a trigger instruction from a spaced report device server (not shown), or on the realization by control circuit 1010 that a predetermined criteria has been satisfied. The selective operation mode conserves power relative to the continuous read mode. Device 100 can be configured to set the default mode to continuous read when device 100 is powered by an external source, such as a vehicle, and to selective activation mode when device 100 is not powered by an external source.

As explained with reference to FIG. 11, data collection device 100 can include a power management circuit 415 which supplies power to circuit boards 108 of data collection device 100 and receives power from one of three power sources, namely serial power source 416 (e.g., USB), a battery power source 417 (normally a rechargeable battery), and a transformer based AC/DC power source 418.

Figure 20:
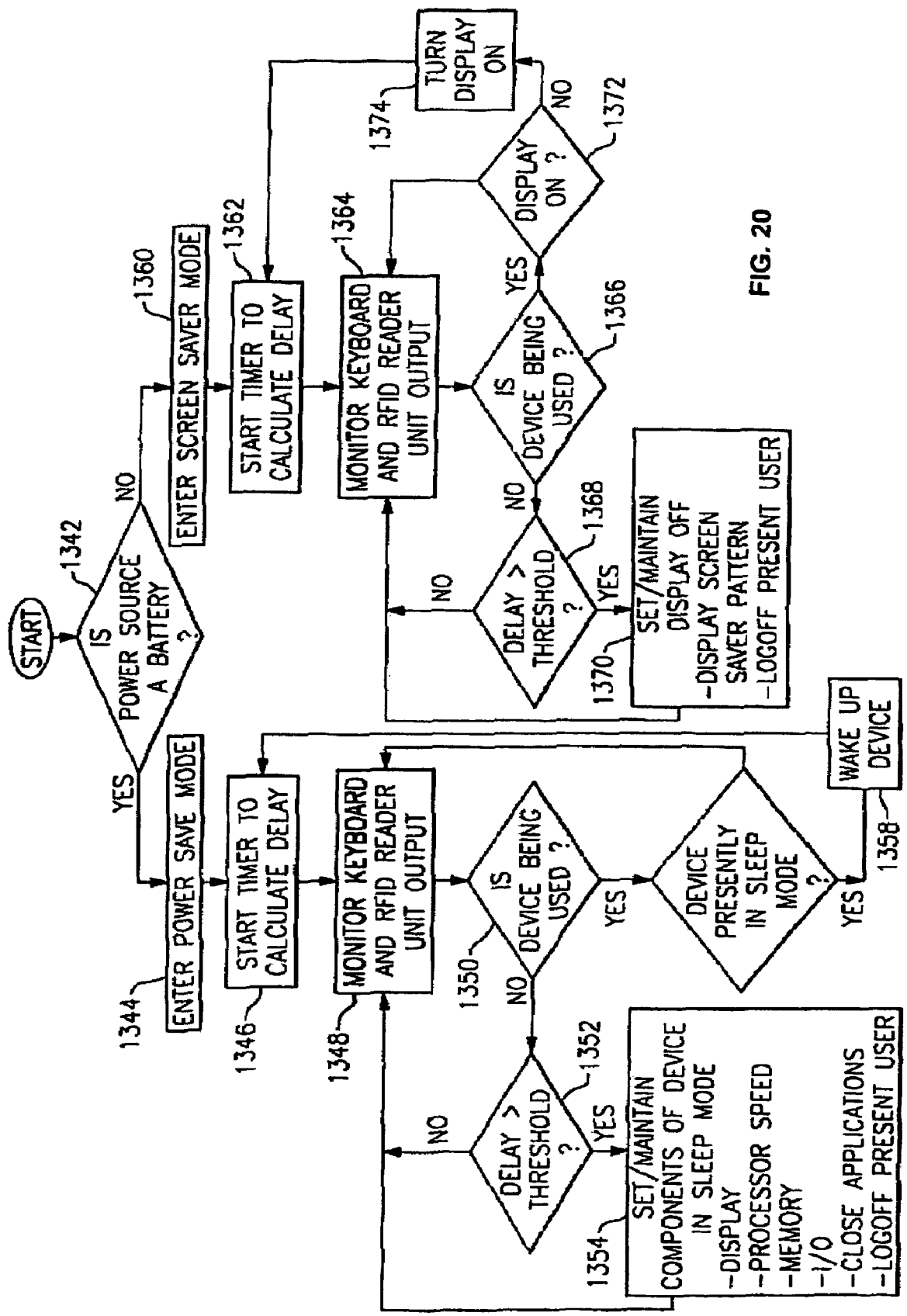
FIG. 20 is a flow diagram illustrating further aspects of a data collection device according to the invention, including certain power management features.

Referring now to the flow diagram of FIG. 20, data collection device 100 at block 1342 determines whether device 100 is currently powered utilizing a battery power source 417 or permanent power sources 416 or 418. If device 100 at block 1342 determines that device 100 is currently powered by battery power source 417, device 100 precedes to block 1344 to enter a power save mode of operation. At block 1346 device 100 starts a timer to calculate a delay. At block 1348 device 100 monitors input received from keyboard 1090 and RFID reader unit 1250. At block 1350 data collection device 100 determines whether device 100 is presently being used by a user. For example, at block 1350 device 100 can determine that device 100 is presently being used if keyboard 1090 at monitoring block 1346, or RFID reader unit 1250, generates an output. At block 1352 data collection device 100 determines whether the present delay is greater than a threshold delay. The threshold delay can be set with a setting in a system registry. If the present delay, the calculation of which was started at block 1346, is greater than the threshold delay then device 100 returns to block 1348 to again monitor keyboard 1090 and RFID reader unit 1250. Examples of thresholds which may be compared to a presently calculated delay at block 1352 are, e.g., five minutes, ten minutes, half hour, forty-five minutes, one hour. If at block 1352 device 100 determines that the presently calculated delay is greater than the threshold delay then device 100 advances to block 1354 to set components of the device or to maintain the components of the device in a sleep mode. In a sleep mode the configurations of various components of devices are reconfigured so that they utilize a reduced amount of power or no power. For example, in a sleep mode a display 1040 can be turned off so that it displays only a screen saver pattern or no pattern. The processor speed of processor IC chip 1030 can be reduced. The access of processor IC chip 1030 to various memories of device 100 can be eliminated. I/O ports of device 100 can be rendered unavailable and applications currently being executed by device can be closed down. Referring again to block 1350, if data collection device 100 at block 1350 determines that device 100 is, in fact, currently being used then device 100 proceeds to block 1356 to determine whether device 100 is presently in a sleep mode, as explained with reference to block 1354. If the device 100 is presently in a sleep mode device 100 advances to block 1358 to wake up the device 100, i.e., return the various components of the device 100 to a fully active state and then proceeds to block 1346 to start another timer calculation delay utilizing real time clock 1013. If at block 1356 device 100 determines that the device 100 is not presently in a sleep mode device 100 advances to block 1348 to again monitor outputs of keyboard 1090 and RFID reader unit 1250.

Referring again to block 1342, if device 100, at block 1342, determines that device 100 is presently not being powered by a battery 417, i.e., being powered by a "permanent" power source, device 100 advances to block 1360 to commence operation in a screen saver mode. Referring to the screen saver mode of operation, device 100 at block 1362 starts a timer to calculate a delay utilizing real time clock 1013 in the manner described previously in connection with block 1346. With the timer calculation being started device 100 proceeds to block 1364 to monitor keyboard 1090 and RFID reader unit 1250 in the manner described previously in connection with block 1348. Device 100 then proceeds to block 1366 to determine whether device 100 is presently being used, in the same manner as described above with reference to block 1350. If device 100 at block 1366 determines that the device 100 is not presently being used device 100 advances to block 1368 to determine whether the present delay, the calculation of which was commenced at block 1362, is greater than a threshold delay. The threshold with reference to block 1368 may be set as a registry setting as previously described. If device 100 at block 1368 determines that the presently calculated delay is greater than a threshold delay device 100 proceeds to block 1370 to set or maintain display 1094 in an off state. In an off state, as referred at block 1370, the windows and icons normally displayed by display 1094 are not displayed, but rather the screen saver pattern is displayed by display 1094. After executing block 1370 device 100 returns to block 1364 to again monitor the outputs of keyboard 1090 and RFID reader unit 1250. If data collection device 100 at block 1366 determines that device 100 is in fact presently being used, device 100 proceeds to block 1372 to determine whether display 1094 is presently on. If display 1094 is not presently on, i.e., is presently displaying a screen saver pattern device 100 proceeds to block 1374 to turn display 1094 on so that display displays its normal collection of, e.g., windows, icons, signature entry prompts or pin entry prompts. After executing block 1374 device 100 returns to block 1362 to start another timer delay calculation utilizing real time clock 1013. If at block 1372 device 100 determines that display 1094 is presently on device returns to block 1364 to again monitor outputs of keyboard 1090 and RFID reader unit 1250.

Figure 21:
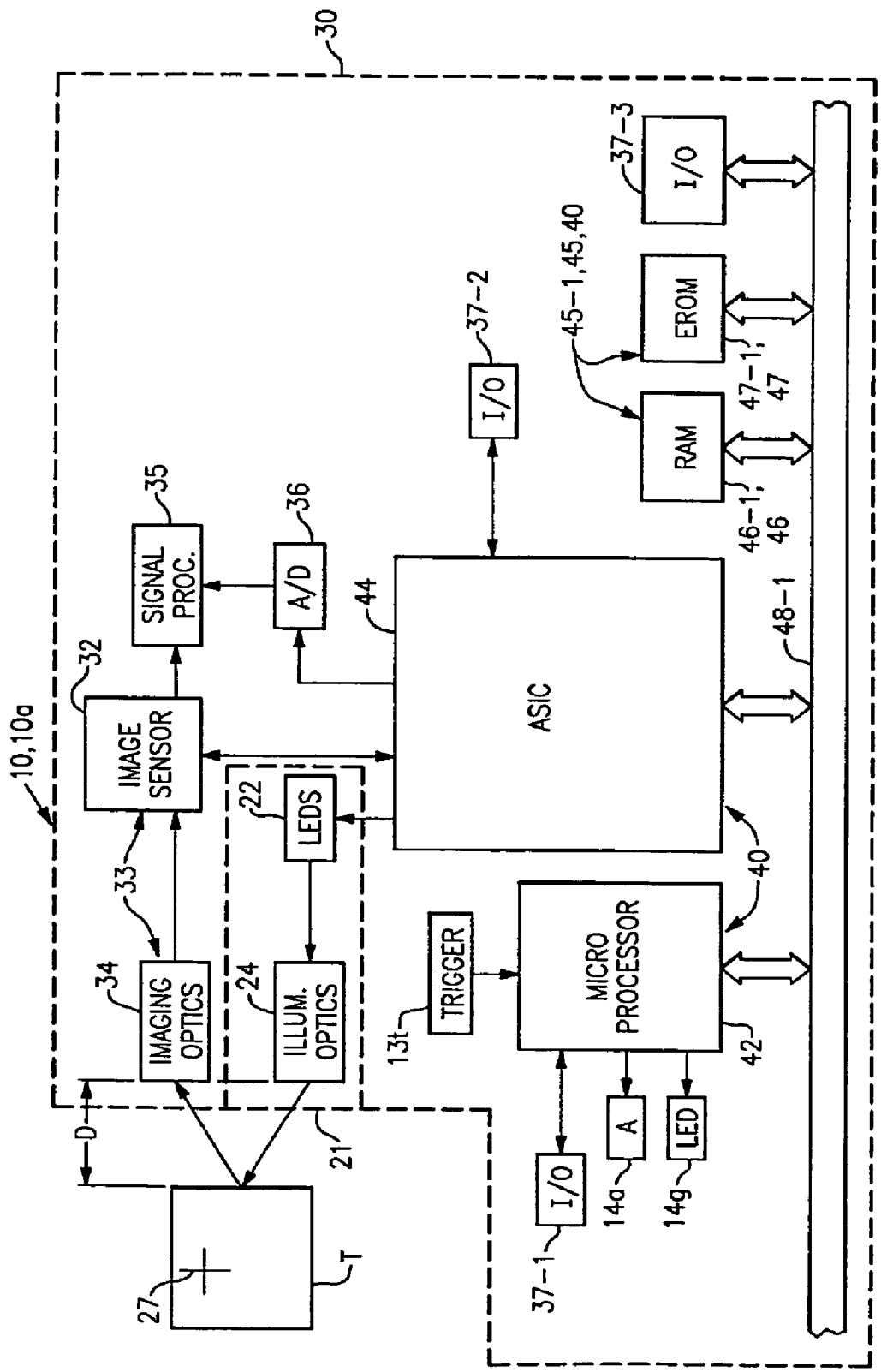
FIG. 21 shows electronic hardware for optical readers and reader communication systems for the invention.

Referring to FIG. 21, optical reader 10a includes a reader processor assembly 30, which includes an illumination assembly 21 for illuminating a target object T, such as a substrate bearing 1D or 2D bar code symbol or a text string, and an imaging assembly 33 for receiving an image of object T and generating an electrical output signal indicative of the data optically encoded therein. Illumination assembly 21 may, for example, include an illumination source assembly 22, together with an illuminating optics assembly 24, such as one or more lenses, diffusers, wedges, reflectors or a combination of such elements, for directing light from light source 22 in the direction of a target object T. Illumination assembly 21 may comprise, for example, laser or light emitting diodes (LEDs) such as white LEDs or red LEDs. Illumination assembly 21 may include target illumination and optics for projecting an aiming pattern on target T. Illumination assembly 21 may also be located remote from reader housing 11, at a location so as to eliminate or reduce specular reflections. Imaging assembly 33 may include an image sensor 32, such as a color or monochrome 1D or 2D CCD, CMOS, NMOS, PMOS, CID or CMD solid state image sensor, together with an imaging optics assembly 34 for receiving and focusing an image of object T onto image sensor 32. The array-based imaging assembly shown in FIG. 21 may be replaced by a laser array based imaging assembly comprising one or more laser sources, a scanning mechanism, emit and receive optics, at least one photodetector and accompanying signal processing circuitry.

Reader processor assembly 30 of FIG. 21 also includes programmable control circuit 40 which preferably comprises an integrated circuit microprocessor 42 and an application specific integrated circuit (ASIC 44). The function of ASIC 44 could also be provided by field programmable gate array (FPGA). Processor 42 and ASIC 44 are both programmable control devices which are able to receive, output and process data in accordance with a stored program stored in memory unit 45 which may comprise such memory elements as a read/write random access memory or RAM 46, 46-1 and an erasable read only memory or EROM 47, 47-1. RAM 46, 46-1 typically includes at least one volatile memory device but may include one or more long term non-volatile memory devices. Processor 42 and ASIC 44 are also both connected to a common bus 48-1 through which program data and working data, including address data, may be received and transmitted in either direction to any circuitry that is also connected thereto. ASIC 44 may, for example, control the illumination of LEDs 22, the timing of image sensor 32 and an analog-to-digital (A/D) converter 36-1, the transmission and reception of data to and from a processor system external to assembly 30, through an RS-232, a network such as an ethernet, a serial bus such as USB, a wireless communication link (or other) compatible I/O interface as is indicated by interface 37-2. ASIC 44 may also control the outputting of user perceptible data via an output device, such as aural output device 14a, a good read LED 14g and/or a display monitor which may be provided by a liquid crystal display such as display 14d.

Looking generally at the use of such devices, in the physical relationship between the data collection device and the target indicia, one may be in a relatively fixed position while the other is moving; both may be fixed; or both may be moving. For example, the data collection device may be a hand held bar code scanner that is being used to read a tag affixed to a shelf, with the user moving the scanner to obtain a good read while the tag remains stationary. Representative products include the IT-3800 1D scanner and IT-4600 2D scanner, available from Hand Held Products, Skaneateles, N.Y., USA. Or, the data collection device may be a fixed mount price checker of the type found in certain retail stores, with the user manipulating a product bearing a target indicia in order to obtain a good read, such as the Hand Held Products TT-8870 image kiosk or price checker. The data collection device may be a fixed mount scanner, and the target indicia may be moving past the scanner in a fixed relationship, such as on a conveyor belt, in which case the window in which the indicia is read is fixed even though the article bearing the indicia is moving, as with the Hand Held Products ST-3700 1D machine-mount scanner. Or, the data collection device may be a portable data terminal, such as those used by various package delivery services, and the target indicia may be on a small package, with the user of the device holding the device in one hand, the package in the other, and manipulating both to obtain a good read, as in for example the Hand Held Products 7400 mobile computer. These examples are illustrative only, it being understood that the general concept involves both the data collection device, and the article bearing the target indicia, each having a freedom-of-motion range independent of the other, of anywhere from permanently fixed to constantly in motion, and such motion may be constant or variable with regard to both speed and trajectory or path.

While the present invention has necessarily been described with reference to a number of specific embodiments, it will be understood that the scope of the invention is not limited thereby.

What We claim is:

1. A hand held data collection device comprising an illumination source for illuminating a target, said illumination source comprising:
  at least one light-emitting diode (LED) having a die, the die including a die surface comprising transition features having a form relative to said die surface, said form comprising a geometric shape having at least one portion disposed in contact with said die surface,
  wherein said transition features are effective to increase the amount of light energy emitted by said die surface relative to the amount of light energy emitted in the absence of said transition features, and
  wherein said geometric shape has at least one dimension that is less than a wavelength of light being generated by said die.

2. The hand held data collection device of claim 1, wherein said hand held data collection device is a bar code scanner, portable data terminal, transaction terminal, or bar code verifier.

3. The hand held data collection device of claim 2, wherein said hand held data collection device comprises a linear (1D) sensor array.

4. The hand held data collection device of claim 2, wherein said hand held data collection device comprises a row-and-column (2D) sensor array.

5. The hand held data collection device of claim 1, wherein said transition features comprise an array of geometric shapes having linear cross-sections.

6. The hand held data collection device of claim 1, wherein said transition features comprise an array of geometric shapes having curvilinear cross-sections.

7. The hand held data collection device of claim 6, wherein said array comprises concentric circles.

8. The hand held data collection device of claim 1, wherein said transition features have at least one dimension of diameter, length, width, or height that is between about 40 nm and about 250 nm.

9. The hand held data collection device of claim 1, wherein said transition features each comprise at least two different portions.

10. The hand held data collection device of claim 1, wherein said transition features are etched into the surface of said die.

11. A method of using the hand held data collection device of claim 1, said hand held data collection device being battery-powered, said method comprising extending the life of said battery by providing said at least one LED with less than the amount of energy required to produce a full potential light output of said at least one LED.

12. A method of using the hand held data collection device of claim 11, comprising providing said at least one LED with only the amount of energy necessary to produce substantially the same amount of illumination that would be produced by said at least one LED in the absence of said transition features.

13. The hand held data collection device of claim 1, said hand held data collection device comprises a laser array imaging assembly comprising at least one laser source, a scanning mechanism, emitting and receiving optics, at least one photodetector, and signal processing circuitry.

14. A method of increasing the illumination provided by a hand held data collection device, said method comprising the step of providing said hand held data collection device with an illumination source comprising:
   at least one LED having a die surface composed of a first material, and
   a second material adjacent said die surface and forming an interface therewith, said first material and said second material having different refractive indices, wherein at least one of said first material and said second material comprise, at said interface, transition features having a form relative to said die surface, said form comprising a geometric shape having at least one portion disposed in contact with said die surface,
   wherein said transition features are effective to increase the amount of light energy passing from the die surface into said second material relative to the amount of light energy so passing in the absence of said transition features,
   and wherein said geometric shape has at least one dimension that is less than a wavelength of light being emitted from said die surface.

15. The method of claim 14, further comprising providing control circuitry for controlling the power provided to said at least one LED between a maximum power level that produces the full potential light output from said at least one LED and a power level less than said maximum power that produces light output less than said full potential light output.

16. The method of claim 15, wherein said control circuitry adjusts the power provided to said at least one LED to provide a dynamic range of illumination.

17. The method of claim 16, wherein said control circuitry adjusts the power provided to said at least one LED based on ambient lighting conditions.

18. The method of claim 16, wherein said control circuitry increases an initial low level of illumination, provided when the device is first actuated, as necessary to obtain a good read.

19. The method of claim 16, wherein said control circuitry decreases an initial high level of illumination, provided when the device is first actuated, as necessary to obtain a good read.

20. The method of claim 16, wherein said control circuitry adjusts the level of illumination, in response to glare or specular reflection, as necessary to obtain a good read.

* * * * *